INVENTOR.
ROBERT H. THORNER

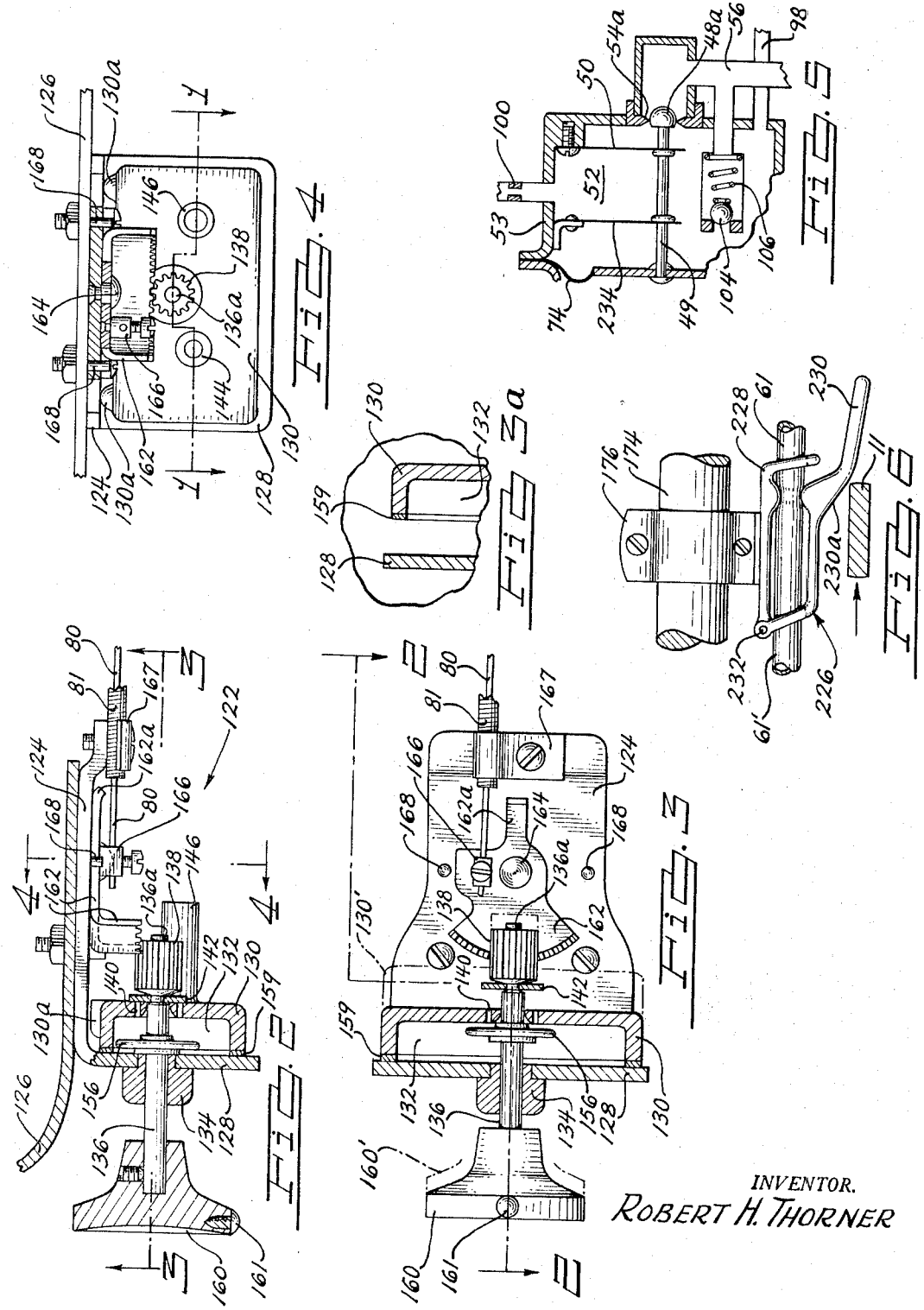

United States Patent Office 3,322,227
Patented May 30, 1967

3,322,227
AUTOMOTIVE SPEED CONTROL SYSTEM
Robert H. Thorner, 8750 W. Chicago Blvd.,
Detroit, Mich. 48206
Filed Oct. 17, 1963, Ser. No. 316,987
38 Claims. (Cl. 180—108)

This invention relates to a speed control system or apparatus for "automatic throttles" as applied in automotive vehicles such as automobiles and trucks.

The present application relates to vehicle speed regulators disclosed in my following patent applications: Serial No. 712,847, filed February 3, 1958, entitled "Control Apparatus for Motor Vehicle Regulator," now Patent No. 3,114,427; Serial No. 283,272, filed May 27, 1963, entitled "Speed Regulating Device" (now abandoned); Serial No. 82,769, filed January 16, 1961, entitled "Speed Regulator Device," now Patent No. 3,213,691; Serial No. 118,411, filed June 20, 1961 entitled "Throttle Control Mechanism," now Patent No. 3,168,933; and Serial No. 266,257, filed March 19, 1963, entitled "Automotive Speed Control Apparatus."

With the increasing use of non-stop highways, sometimes referred to as turnpikes, thruways, freeways, etc., there is an increasing need for an "automatic throttle" for automotive vehicles. When an automobile is driven for long distances on these non-stop highways, the operator's foot and leg muscles become tired and strained due to the necessity of holding the accelerator in various desired positions for long periods of time. A main purpose of all "Automatic Throttle" devices, as disclosed herein, is to enable the vehicle operator to drive without the necessity of holding his foot on the accelerator. Such devices are now believed to add safety in operating automotive vehicles because (1) they reduce fatigue, thereby reducing the tendency to fall asleep, (2) they maintain a selected speed, whereas in normal driving it is easy on long trips to exceed the intended speed.

At the present state of the art, there is a wide difference of opinion among people at the automotive firms regarding what is desired for such speed control devices. These devices generally comprise (1) some type of means to regulate vehicle speed, either automatically (with a governor mechanism) or manually (hand-throttle), and (2) a selective control system to determine when and how the speed-regulating means is operated and rendered inactive or inoperative, etc.

A large difference in opinion exists particularly in the control system for the governing mechanism. Some of my present beliefs are discussed extensively in said application, Serial No. 266,257. Some of these views, of course, may have to be altered in accordance with eventual public opinion, because of ultimate acceptance or rejection of the various systems offered. However, based on public acceptance to date, I presently believe that the eventual market will be large enough to support at least two basic automatic governor-type speed controls in addition to a good hand-throttle. The first type of device is presently available to the public and comprises a "quality" speed control system. Such device probably will find its largest market on medium priced and luxury vehicles, and possibly for luxury models of lower priced vehicles. My said application, Serial No. 266,257 discloses a control system that might fall in this category, as it provides features desired by many people (such as accelerator-resistance) who would pay a premium for such features. My centrifugal-liquid sensing and the governing system disclosed in my Patents Nos. 3,068,849 and 3,084,758 provide such excellent governing characteristics to qualify as a "quality" governing device. This governing system has been offered commercially by an automotive manufacturer as an option on several models of its automobiles.

I believe that the eventual market will also support a second "economy" speed control system in addition to the "quality" system discussed above. Such "economy" device will include a true "closed-loop" governing mechanism and a control system therefor, but all with certain compromises to enable low-cost manufacture.

A main object of the present invention is to provide a governor-type speed control system, for an automotive vehicle particularly, but not necessarily, for carbureted internal combustion engines and which is very simple in construction thereby lending itself to low cost manufacture.

Another object of the present invention is to provide an automotive speed-control system of the type described in the preceding paragraph and having a carbureted internal combustion engine, in which engine vacuum is used as a source of energy in operating the governor system, and in which restraining means are provided to enable the vacuum itself to maintain the system operative (after manual initiation by the vehicle-driver), but automatically renders the system inoperative whenever the engine vacuum dissipates, for example, as a result of turning off the engine ignition.

Another object of the present invention is to provide an automotive speed control system as described in the preceding paragraph, including novel pressure responsive means operated by engine vacuum, and including means to assure its proper functioning at the very low vacuum at wide-open-throttle as well as the very high vacuum while "coasting" when the throttle is in its idle position.

An object of the present invention is to provide an automotive speed-control system as described in either or all of the three preceding paragraphs, including a simple speed governor or regulator mechanism which includes novel means to cause automatic operation thereof after the vehicle is manually accelerated to a speed at or near a governed speed manually preselected by the driver.

A further object of the present invention is to provide an automotive speed control device as described in the preceding paragraph in which the governor mechanism is rendered operative automatically after the vehicle is manually accelerated to a speed which is substantially less than the preselected speed, and wherein the governing mechanism effects an automatic acceleration from this lesser speed to the preselected governed speed.

Further objects and advantages of the invention will be apparent from the following description, taken in connection with the appended drawings, in which:

FIG. 2 is a partial sectional view of the selector mechanism of the control system for establishing the operating condition of the governor mechanism as disclosed in FIG. 1 and taken along the line 2—2 of FIG. 3;

FIG. 3 is another partial sectional view of the selector mechanism shown in FIGS. 1 and 2 and taken along the line 3—3 of FIG. 2;

FIG. 3a is a fragmentary and partial sectional view of the selector mechanism shown in FIGS. 1 and 2 in its inoperative position;

FIG. 4 is still another partial sectional view of the selector mechanism of FIGS. 1–3 taken along the line 4—4 of FIG. 2;

FIG. 5 is a fragmentary and partial sectional view of a modified form of the pilot valve means of the present invention; and FIG. 6 shows an extremely simple modified form of brake operated vacuum shut-off valve of the present invention.

Figure 1:
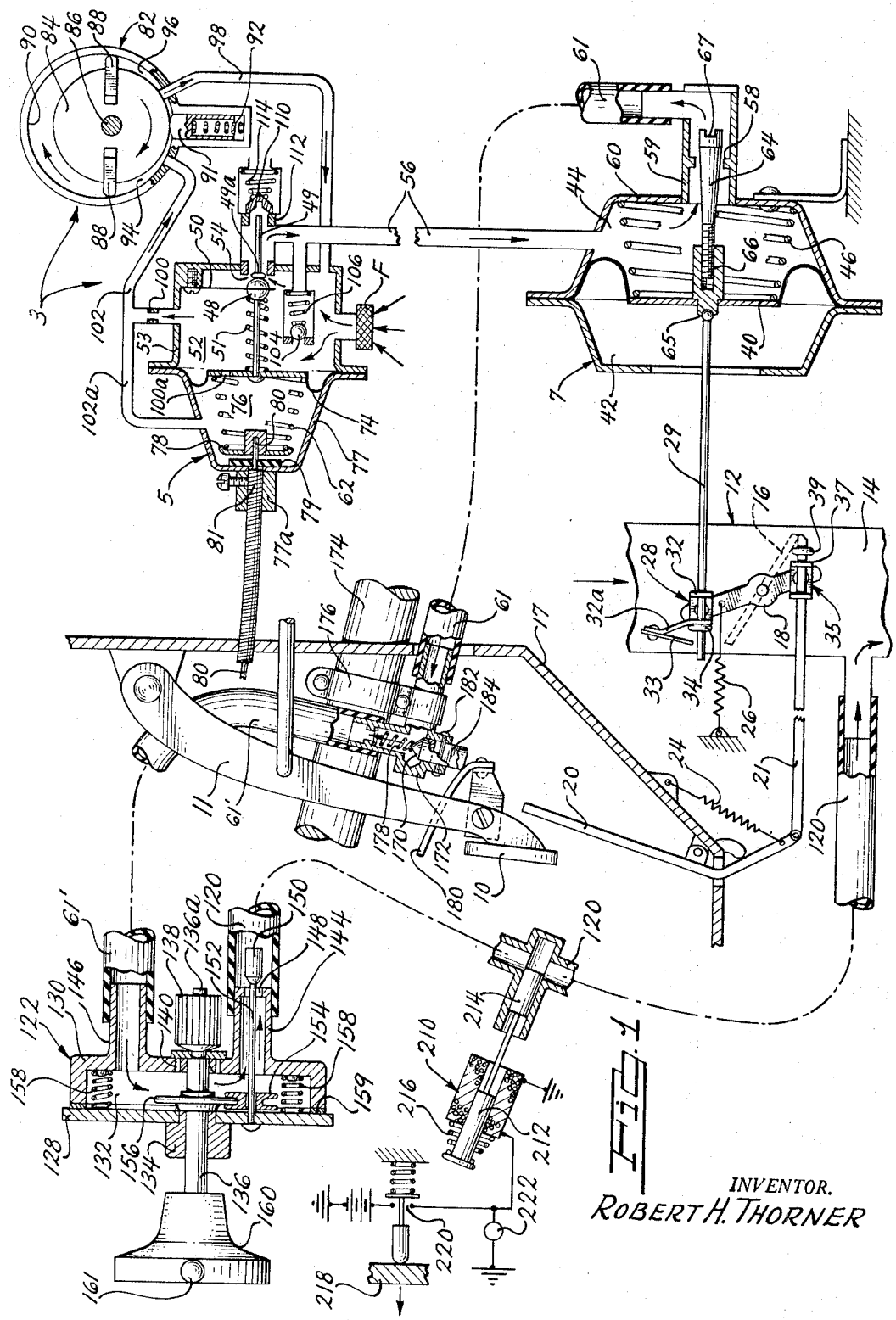
FIG. 1 is a somewhat diagrammatic view of a complete installation of one form of automotive speed control apparatus of the present invention mounted in an automotive vehicle and showing the cooperation of the control system and an automatic speed regulating mechanism, and in which the selector means of the control system is shown in section taken along the line 1—1 of FIG. 4.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

It is also to be understood that the present invention may be used in any kind of highway or road vehicle such as for automobiles and trucks, and may control any kind of engine therein such as an internal combustion gasoline engine or diesel engine, a gas turbine, etc. The governor mechanism disclosed herein has particular utility in combination with the vacuum control system of the present invention. However, the control system may also be used with any other suitable speed governor mechanism or equivalent, or with any other kind of mechanism tending to correct throttle position in any desired manner.

The form of the invention illustrated by the automotive speed control apparatus shown in FIG. 1 will first be explained from a constructional standpoint before discussing the operation. The speed governor or regulator mechanism will first be explained in its automatic operation, and then the control system therefor will be discussed. The various components illustrated in FIG. 1 are shown in working cooperation primarily for ease of understanding and are not necessarily shown in true proportion.

SPEED GOVERNOR MECHANISM

The speed regulator mechanism illustrated in FIG. 1 includes three basic components or units, as follows: a sensor or pressure generator unit, generally indicated by the numeral 3; a brain unit, generally indicated by the numeral 5; and a servo-motor unit, generally indicated by the numeral 7.

In FIG. 1 there is shown a conventional brake pedal 10 supported by an arm 11, and carburetor 12 in an engine intake passage or manifold 14 and including a control member such as a throttle 16 with a lever 18, operated by an accelerator 20 hingably connected to a floorboard 17 through a link 21 all biased in their idle-speed direction by an idle spring 24 and a lever spring 26, to be discussed hereinafter. The lever 18 and throttle 16 are operated by the speed-regulator mechanism through an override or lost-motion unit 28 having a shaft 29 cooperating with a U-shaped bracket or member 32 hingably connected to lever 18 by suitable means, as by a rivet, and having holes to enable shaft 29 to slide therethrough. An abutment 34 is suitably secured to shaft 29 to enable actuation of lever 18 by a diaphragm 40. One arm of the U-shaped member 32 has an extension 32a to support a leaf spring clicker 33 operating in a manner to be described. In the form shown, the accelerator linkage engages lever 18 by means of a second override or lost-motion unit 35 having a second U-shaped member or bracket 37 carried by the lower portion of lever 18, and having holes to enable shaft 21 to slide therethrough. An abutment 39 is secured to the shaft 21 to enable actuation of lever 18 by the accelerator.

The override unit 28 is actuated by a pressure responsive member of the servo-motor 7, such as the diaphragm 40 having atmospheric pressure on one side thereof in a chamber 42 and vacuum on the other side thereof in a chamber 44. The vacuum-derived force of diaphragm 40 is biased or opposed by a servo-spring 46 which tends to close the throttle 16 when the regulator is in operation. The vacuum in chamber 44 acting on diaphragm 40 is modulated by a pilot valve 48 carried by a shaft 49 of the brain unit 5 supported for frictionless movements at one end of a leaf spring member 50, which leaf member is rigidly mounted at its other end to a fixed portion of the vehicle by suitable means, as by a screw. The ball pilot-valve 48 illustrated in FIG. 1 is slidable on the shaft 49 and is urged to the right by a soft spring 51 acting against an abutment 49a which is suitably secured to the shaft, or is a part thereof. This construction acts as though the valve were secured to the shaft when the shaft is moved by diaphragm 74 in speed-regulating movements. The valve is slidable on shaft 49 for purposes to be described.

The pilot-valve controls a fluid circuit in which air from the atmosphere passes through a filter F into a chamber 52 and then flows through an inlet orifice or restriction 54, a conduit or passage 56 which is in open communication with chamber 44 (preferably made of synthetic rubber tubing), then through an outlet orifice or restriction 58 in a tube 59 secured to a cover 60, and out through a conduit or passage 61 subsequently to the intake manifold 14 without further restriction during operation of the governor mechanism by means to be discussed further. The passage 61 is preferably made of synthetic rubber tubing.

The pilot valve 48 may assume any suitable contour, but in the form shown, the ball valve is held in alignment by leaf spring 50 and is biased in a closing direction by a speeder-spring 62 for cooperation with restriction 54 to vary the aperture thereof. Spring 62 always overpowers spring 51.

The pressure (vacuum) in passage 56 between the two restrictions 54 and 58 is applied to diaphragm 40. A tapered "re-set" valve 64 may optionally be provided to be suitably connected to diaphragm 40 and is effective upon movements of the diaphragm and throttle 16 to vary the aperture at restriction 58 as a function of the position of the throttle. The link 29 is connected to diaphragm 40 by any suitable means, as by a ball and socket 65. The socket includes a threaded portion 66 cooperating with mating threads of the valve 64. Adjustment of valve 64 by a screw slot 67 changes its effective relationship with the throttle 16, to provide speed-droop control.

When the pilot valve 48 is held closed by speeder-spring 62, substantially the maximum available vacuum exists in conduit 56 and chamber 44. When the pilot valve progressively is moved from its seated position to its full open position, by means to be discussed, the vacuum in conduit 56 and chamber 44 is modulated and gradually reduces to a value enabling full leftward travel of diaphragm 40. The maximum diaphragm vacuum obtainable in chamber 44 during regulator operation, such as 5 to 7 inches of mercury, for example, is established when the diaphragm 40 overpowers the force of spring 46 to advance throttle 16 until the vacuum reduces enough to balance the spring. For the same reason, the minimum manifold vacuum obtainable in the engine during regulator operation is substantially the same as this maximum diaphragm vacuum. As valve 48 gradually opens to reduce the vacuum in chamber 44 from the maximum value, diaphragm 40 gradually moves to the left as a function of the travel of valve 48 to the left, and conversely, as shown in FIG. 1.

A pressure-responsive member, such as a sensing diaphragm 74 in the brain unit, provides forces acting on the pilot valve in response to vacuum transmitted from the sensor unit to a chamber 76 formed by a cover 77 and diaphragm 74, which vacuum varies as a function of vehicle (or engine) speed in a manner to be described. The forces of diaphragm 74 are opposed and balanced by spring 62 which is manually adjusted by axial movement of a spring retainer 78 operated by suitable shaft means inserted through a seal 79, such as a flexible shaft 80 controlled by the operator and slidable in a sheath 81, to be discussed further. A bushing 77a is secured to cover 77 by suitable means, as by staking, or is a part of cover 77. The sheath is inserted in the bore of the bushing, and secured, as by a screw. The seal 79 may comprise a disc made of synthetic rubber such as "Hycar," suitably secured to a wall of cover 77, as by clamping or bonding to the metal. The disc has a small hole to enable the wire shaft 80 to slide therethrough without air leakage.

The signal unit or pressure generator 3, is shown as an example of means for producing a vacuum in chamber 76 that varies as a function of vehicle speed in this instance. The pressure generator includes rotary, positive displacement, air pumping means, such as a vane pump, generally indicated by the numeral 82. The pump includes a concentric rotor 84 driven by the conventional speedometer shaft 86 (not shown), or by other suitable rotary drive means and revolving a pair of vanes 88 slidable radially to ride against an eccentric cylinder 90. The vanes are urged against the cylinder by centrifugal force and, if desired, by conventional spring means. As illustrated, rotary movement of the vanes 88 produces a vacuum in a chamber 94 and the air exhausts through a chamber 96 and a passage 98 to substantially atmospheric pressure in chamber 52. A novel sealing vane 91 is held against the surface of the rotor by spring means 92 to take up clearance for avoiding close production fits in separating chambers 94 and 96. The sliding ends of vanes 88 should have the same radius of curvature as the surface of rotor 84 in order to pass vane 91 smoothly.

The vacuum in chamber 94 causes air to flow through filter F, chamber 52, and through a bleed restriction 100 into passage 102 which communicates with chamber 94, and with chamber 76 through branch passage 102a. The combination of these air passages and the restriction 100 and pumping means 82 all taken together comprise the "pressure generator" to produce a vacuum, in this instance, acting on diaphragm 74 that varies with vehicle speed; and the pressure generator in combination with diaphragm 74 comprises a force generator for producing the forces acting on the pilot valve and varying as a function of vehicle speed. As the rotary speed of the vanes increases, the vacuum increases functionally as air bleeds through restriction 100, and conversely. By venting chamber 96 to chamber 52 through passage 98, the pressure differential acting on the sensing member (diaphragm 74) is substantially independent of the pressure drop through filter F, as disclosed previously in my Patent No. 2,887,998 for a vacuum-sensing speed governor.

This type of pump can be used as part of a pressure generator in this environment since its purpose is to generate pressure and not to move a fluid. The air-bleed provided by restriction 100 is as small as possible and is only necessary to provide a speed-pressure "curve" in which any change of vacuum is sufficiently fast (as the vehicle speed changes) to provide stable governor operation. There is a slight bleed past vanes 88, but a controllable additional bleed is desirable and is provided by restriction 100. The restriction 100 could be optionally provided in diaphragm 74, illustrated as orifice 100a, so that the branch passage including restriction 100 could be omitted.

In order to consider the speed-regulating action, assume temporarily that link 29 is connected to operate lever 18 as though hingably connected together. The speed-regulating action of the governor mechanism after attaining a preselected speed as described thus far is as follows: When the rotary speed of the vehicle and vanes 88 increases, which increases the vacuum in chamber 76, diaphragm 74 pulls the pilot valve 48 to the left biased by spring 62 to open the restriction 54 gradually as the speed increases. This action decreases the vacuum in chamber 44 in a manner previously described, so that spring 46 retards throttle 16 tending to restore the regulated speed. When the vehicle (or engine) speed decreases, the regulating action is the reverse of that above described, to advance the control means and restore or maintain the governed speed.

The term "sensing means" as used herein refers to the combination of elements that provide a varying force acting on the pilot valve in which a change in said force is produced in response to a speed-change signal. In the forms shown, the "sensing means" comprises the pressure generator 3, the connecting tubes 102, 102a and the diaphragm 74.

The diaphragm 40 and spring 46 are selected to hold the throttle at its maximum opening at the highest practical diaphragm vacuum such as 5–7 inches of mercury in passage 56 and chamber 44. As previously described, the necessary diaphragm vacuum is determined by the force of spring 46 and the size of diaphragm 40. It is desired to use as high a diaphragm vacuum as possible, which might be termed the "critical vacuum," in order to provide sufficient force to operate the throttle and any associated linkages. However, as the total available manifold vacuum tends to fall below this critical value (as when ascending steep hills) the throttle gradually is retarded by diaphragm 40 to maintain this vacuum (while the pilot valve is closed by diaphragm 74 "trying" futilely to increase the diaphragm vacuum) so that the desired regulated speed cannot be maintained thereafter. Thus the maximum diaphragm vacuum must be chosen to compromise these opposing factors. As the pilot valve 48 opens when the manifold vacuum is above the critical value, the diaphragm vacuum gradually is reduced from its maximum as above noted by movement of the pilot valve to an amount which enables spring 46 to retard throttle 16 as required. Hence the servo-motor will not start moving to the left, as viewed in FIG. 1, until the vacuum in chamber 44 is reduced by movement of pilot valve 48 to be less than the value of this critical vacuum. Thus if the spring 46 is selected to enable the governor mechanism to maintain the governed speed at 5 inches of mercury, for example, the size of diaphragm 40 would cause it to start moving at a lesser vacuum, such as 4¾ inches of mercury, for example, when the pilot valve starts to open. The leftward travel of diaphragm 40 to close throttle 16 might be effected when the pilot valve opens enough to produce a still lesser vacuum, such as 2½ inches of mercury, for example, determined by the rate of spring 46. The foregoing concept is utilized in a novel manner to facilitate automatic acceleration at a limited rate, to be discussed further hereinafter.

When the operator accelerates the vehicle at a moderate rate with the throttle producing a higher manifold vacuum, such as 12–14 inches of mercury, for example, this higher vacuum acts on the exposed portion of the pilot valve and might delay its opening slightly to a higher speed than selected. If desired, a relief or regulator valve 104 which is biased by a light spring 106 is set to open at a manifold vacuum of about 6–7 inches of mercury, with the foregoing example, for limiting the vacuum in passage 56 and chamber 44 to this value by bleeding air thereto. This vacuum is high enough to hold diaphragm 40 in its extreme right position until the pilot valve opens.

Another valve 110 is held against an orifice 112 by a light spring 114 to close the orifice at a predetermined vehicle speed and the governor mechanism automatically regulates the vehicle at the preselected speed. The shaft 49 is moved to the right by spring 62 to open valve 110 whenever the vehicle speed is below the governed speed, which provides an air-bleed into passage 56 for purposes to be described.

While any governor mechanism may be used with my novel control system, the speed-regulating mechanism above described has particular utility in the combinations disclosed herein. Also, this speed-regulating or governor mechanism may include other types of force generators or pressure-generators, such as the vacuum generator disclosed in FIG. 1 of my said application, Serial No. 82,769, or the flyweight disclosed in my Patent No. 3,092,084.

CONTROL SYSTEM

The control system, in the form illustrated herein, includes two main components for controlling the transfer of vacuum to the tube 61 from another tube or conduit 120 (preferably made of synthetic rubber) to supply vacuum from the manifold 14 as a source of energy or power to the servo-mechanism in the "governor" portion of the system. A main component is a selector mechanism or unit, generally indicated by the numeral 122. The selector unit of the present invention includes a manually-operated member or means movable upon operation at least once by the vehicle-driver to open a valve for transferring or communicating the full vacuum from the manifold 14 through tube 120 and another tube 61' to the tube 61. And the selector unit further includes a pressure-sensitive member which uses the vacuum itself to hold all the elements in operating position for maintaining such communication of vacuum to the tube 61. Furthermore, this vacuum is maintained in these supply tubes by the pressure-sensitive member as long as the engine runs (to provide the source vacuum) or unless the manually-operated means is deliberately returned to its inoperative position by the driver thereby shutting off the vacuum to preclude transfer thereof to the servo-motor. If the operator fails to move the manually operated means to shut off the valve, the dissipation of vacuum as a result of turning off the ignition when stopping the engine acts on the pressure-sensitive member to automatically cause movement of the manual means to shut off the valve; then the operator again must consciously move the manual means deliberately to activate the system.

The particular form of pressure-sensitive member illustrated in the present invention comprises means forming a chamber adapted to be sealed by a cover to contain air under vacuum which maintains the seal when the manually-operated means is moved to provide such transfer of vacuum; the cover forms one or more walls of the chamber and is movable with and by the manual means to open the chamber to atmosphere and "break" the vacuum when the manual means stands in its inoperative position. In this respect, the selector unit comprises means to restrain operation of the speed-control device until deliberately initiated at least once by the vehicle driver—even after the engine moves the vehicle.

Referring to FIGS. 1–4, the form of the selector unit illustrated herein includes a mounting bracket 124 suitably secured to a fixed portion of the vehicle in the driver's compartment, such as by screws fastened to the underside of the instrument panel 126. The bracket includes a downturned portion or plate 128 which cooperates with a cover or cup member 130 to form a chamber 132 which is closed, to the extent shown in FIGS. 1 and 2 and under conditions to be described. The cover actually comprises the pressure-sensitive member, as will be discussed. A bushing 134 is suitably secured to plate 128, as by staking or soldering, and includes a bore to guide and support a shaft 136 in axial movements in relation to the bushing. The shaft extends through chamber 132 and also through a tapered hole in cover 130 and carries a pinion gear 138 suitably secured to a portion of the shaft 136a having a reduced diameter to receive the gear.

A series of vents or holes 140 are provided in cover 130 radially equidistant from shaft 136. The holes are covered and closed by a disc-valve 142 (FIG. 2) inserted on the small diameter 136a of shaft 136 and retained by the gear between it and the step in shaft 136.

The cover 130 includes two hose nipples 144 and 146 to receive tubes 120 and 61', respectively. Nipple 144 includes a non-restricting orifice 148 (FIG. 1) to cooperate with a valve body 150 supported by a stem or shaft 152 made of any suitable rod such as thin music wire. The stem is secured to and supported by plate 128 by suitable means, as by riveting, staking, soldering, etc., so that the stem and valve body are restrained from axial movements. A restrictor 154 having suitably flanged ends fits loosely on stem 152 for axial movements in relation thereto for purposes to be described. An actuating disc 156 is suitably secured to shaft 136 and extends between the flanged ends of restrictor 154 to produce axial movements thereof upon axial movements of the shaft 136.

A pair of springs 158 are mounted in chamber 132 acting to urge cover 130 to the right away from plate 128 to open chamber 132 to the atmosphere, as shown in FIG. 3a, in a manner to be described. A gasket 159 made of any suitable relatively hard material may be provided to seal the vacuum in chamber 132; the gasket is glued or otherwise secured either to the plate or cover while the other surface must be free to separate the two elements at any time as will be discussed.

A knob 160 having a single tactile "Braille" indicator 161 on its periphery is secured to shaft 136, as by a set screw (FIG. 2), to facilitate axial and rotary movements of the shaft as required, to be explained.

Referring to FIGS. 2, 3 and 4, means are provided in the selector unit to translate rotary movements of the knob to axial movements of the flexible shaft 80 in any desired ratio. In the example shown herein, such means comprise a circular rack-piece 162 connected to the mounting bracket 124 for freely moving angular movements by a suitable hinge pin 164. A conventional swivel 166, as used for carburetors, is hingably secured to rack-piece 162; and flexible shaft 80 is inserted through the swivel and retained by the usual screw provided with the swivel, as shown. The sheath 81 is secured to the mounting bracket 124 by a clamp 167 fastened by suitable means, as by a screw. In this manner, angular movements of the rack-piece produce axial movements of the flexible shaft.

Thus, the knob 160 is revolved by the driver to select the governed speed, by causing such angular movements of the rack-piece to move shaft 80 and vary the force of speeder spring 62 as desired. A pair of stops 168 are secured to (or are a part of) the mounting bracket 124 to limit the rotary movement of the rack-piece so that the knob 160 can be rotated only one complete turn. The same result may be achieved by any other equivalent stop means, such as by limiting the shaft itself. Then the entire speed range of the speed-regulator mechanism is calibrated to fall within this one turn; this may be accomplished in the present invention by varying the rate of spring 62 and/or varying the radial position of the swivel 166 as desired. The driver memorizes the speeds corresponding to various "clock" positions of the tactile indicator 161. Thereafter, he rotates the knob by feeling the tactile indicator to establish the correct "clock" position for the desired speed. In this manner the driver can select the governed speed at any time without removing his sight from the road. The tactile indicator in FIGS. 2 and 3 is shown positioned at six o'clock with the gear 138 in the middle of its travel with respect to the rack-piece 162. In FIG. 1, the tactile indicator is shown in its twelve o'clock position when the rack-piece contacts either of its stops 168. The rack-piece 162 includes an extension 162a prebent to provide a friction force when retained by hinge pin 164, to maintain knob 160 in any set rotary position. Abutments 130a are provided as part of cover 130 to prevent the cover from rotating when the knob is revolved.

The second component of the control system comprises a valve 170 slidable in a housing 172 which is secured to the steering post 174 (or some other fixed portion of the vehicle) by a bracket 176. The housing includes hose nipples to receive tubes 61 and 61', as shown in FIG. 1, for transferring manifold vacuum from the selector unit to the servo-motor. The valve 170 is biased open by a spring 178 to ride on a cam-piece 180 suitably secured to the brake arm 11. A pin 182 projects through a slot 184 in valve 170 which vents the tube 61, chamber 44 and tube 56 to the atmosphere whenever the brake pedal is depressed; such depression of the brake pedal cams the valve 170 upwardly to contain the vacuum in tubes 61' and 120, while releasing all vacuum to the servo-motor to completely inactivate the speed-regulator mechanism.

Additional operation of the control mechanism described thus far is as follows: When the vehicle is at rest, the cover 130 is separated from plate 128 by springs 158, as shown in FIG. 3a; at this time the valve body 150 closes orifice 148. After the engine is started, vacuum is produced in tube 120 only to the valve 150, but the parts remain in the position shown in FIG. 3a. When the driver pulls the knob 160, the left end of gear 138 acts on disc-valve 142 to force the cover 130 against plate 128 to form and close the chamber 132, and all parts are then in the position shown in FIG. 1. At this time the orifice 148 is open, and substantially the full manifold vacuum is transmitted to chamber 132, and tubes 61' and 61 (since valve 170 is open) to the restriction 58. The vacuum in chamber 132 acts on the full exposed inside area of the cup-shaped rectangular cover 130 to overpower the force of springs 158. Thus the vacuum itself acts to hold the cover to close chamber 132 as long as sufficient vacuum is maintained therein.

It is important to appreciate that the parts in the vacuum supply circuit (such as the orifice 148, valve 170 and the tubes 120, 61' and 61) offer no resistance or "line-loss" with all air-flows regardless of the openings of valves 64, 48, 104 and 110. The only intended restrictions during normal speed governor operation are at orifices 54 and 58, operating as described. The air bleed itself is provided primarily to enable pilot valve 48 to control pressure.

Also at this time, the vehicle speed is less than the governed speed set by knob 160 as above described. Then spring 62 overpowers spring 51 and forces shaft 49 to slide through valve 48, now held closed on its seating orifice 54. The right end of shaft 49 opens the activating valve 110, as previously described. With valve 110 open, the bleed of the air through orifice 112 limits the vacuum in tube 56 and chamber 44 sufficiently to enable spring 46 to hold diaphragm 40 in its extreme left position, as viewed in FIG. 1. Under these circumstances, as the operator depresses the accelerator, the U-bracket 32 slides rightwardly on rod 29 carrying leaf spring 33 past abutment 34 without a click due to the angle of the leaf 33. Hence, regardless of the manifold vacuum in chamber 132 and tube 61', the governor is rendered inactive (but ready) to operate throttle 16, until a second step or operation is performed by the driver. This step is incident to normal acceleration of the vehicle. When the driver advances accelerator 20 to increase-speed to or less than the preselected speed, the vacuum in chamber 76 pulls diaphragm 74 to the left which closes valve 110. This preferably is made to occur at a vehicle speed less than the set speed, so that the full vacuum limited by relief valve 104 is established in tube 56 and chamber 44.

This relief valve vacuum is high enough (such as 7 inches of mercury for example) as previously explained, to pull diaphragm 40 to the right and open throttle 16 to an extent limited by the "critical vacuum," such as 5 inches of mercury, for example. Now when abutment 34 moves to the right to engage U-bracket 32, it bends the leaf spring 33 which snaps loud enough when the abutment passes the leaf to produce an audible signal for the driver to remove his foot from the accelerator. During these last 2–5 m.p.h., the vehicle is accelerated automatically; and the driver can hear (and feel) the short but definite acceleration to the governed speed, thereby providing another audible signal that the driver can now remove his foot from the accelerator. When the preset governed speed is attained, the pilot valve 48 is opened by diaphragm 74 to bleed air into chamber 44; and thereafter the governor mechanism automatically maintains this preset value in the speed regulating action at all loads, as previously described. The operator can override the governor action at any time by depressing the accelerator enabled by lost-motion means 28, and when he removes his foot from the accelerator the vehicle speed returns to the preset governed value.

When the brake pedal is depressed to retard vehicle speed, valve 170 closes to shut off all vacuum to chamber 44, as explained. Instantly the spring 46 moves diaphragm 40 to its extreme leftward position out of the way of normal accelerator movement, so that spring 26 moves the throttle to its idle position. At this time, valve 48 is closed and valve 110 is again opened. Since the full manifold vacuum is maintained in chamber 132, the selector unit is unaffected by depressing the brake pedal. When the brake pedal is released and valve 170 again opens to transmit vacuum through tube 61 to orifice 58, the governor mechanism is maintained inactive because of the air-bleed past valve 110 as previously explained. In order to re-activate the governor mechanism, it is not necessary to reset knob 160 in any way. It is only necessary for the driver to repeat the manual acceleration by opening throttle 16 until valve 110 is closed to produce one or both of the audible signals, thereby indicating that he can remove his foot from the accelerator, all as previously described.

If at any time, the driver wishes to render the automatic throttle or governor action inoperative, he pushes knob 160 "in" to the right, as viewed herein. As shown in FIGS. 1–3, the shaft 136 moves disc valve 142 to open the vents 140; and simultaneously the restrictor 154 is moved to cover the inlet of nipple 144. At this instant, the knob is in the position shown in FIG. 3. The vacuum instantly dissipates from chamber 132, tubes 61', 61, 56 and chamber 44, and diaphragm 40 is moved to the left out of operation as previously described. Without vacuum in chamber 132, the springs 158 move the cover 130 to the position 130' in FIG. 3, or as shown better in FIG. 3a. This action carries the knob 160 to the position 160' shown in FIG. 3, but it also can be forced to this position by the driver as he presses on the knob.

At this time, valve 150 closes orifice 148, and with the large gap in chamber 132, the operator must again deliberately pull knob 160 into the position shown in FIG. 1. If this is performed while the vehicle is being driven by the operator, the cover is held in its ready position and the automatic throttle can be activated as before.

After the driver depresses the brake and thereafter shuts down the vehicle, the vacuum in the system dissipates as a result of turning off the ignition (which is a movable element of the vehicle). Even if the driver has not touched knob 160, it is automatically moved by springs 158 to the right since vacuum no longer acts on cover 130. Then, as before, the parts of the selector unit stand in a position corresponding to that shown in FIG. 3a, in which valve 150 closes orifice 148. After the engine is again started by the same or a new driver, he must consciously and deliberately pull knob 160 at least once; and until the engine is stopped again or he pushes the knob to the right, he can continually (after each brake depression) activate the speed-regulator merely by accelerating to the predetermined engaging speed without any further reset of knob 160.

In order to accomplish the foregoing operation of the selector unit, the tapered hole in the cover is provided to enable slight universal movement thereof in relation to shaft 136 so that the cover always seats flush against plate 128, irrespective of slight production misalignment. Similarly, disc valve 142 is disposed for slight angular movements to close flush against the cover in all production units to close the vents 140.

The effective area of the cover 130 must be large enough to be held in its closed position (FIG. 1) despite springs 158, even at very low manifold vacuum such as one inch of mercury. In this instance, if the area is two square inches, the total vacuum force is one pound, which is adequate with a total biasing spring force of 10–14 oz.

If more force is desired, the area of cover 130 can be increased slightly and/or the force of springs 158 can be increased. The reason the vents 140 and restrictor 154 are provided is to "break" the vacuum on the cover when knob 160 is pushed in at high manifold vacuum such as 20 inches of mercury, for example. The total vacuum force on the cover at 2 square inches would be 20 pounds in this instance, which would require an excessive push on the small knob 160.

While any type of pressure sensitive member may be employed in the present invention to accomplish the above described action, the cover-type member enables a smaller unit at lower cost. A flat rubber diaphragm, for example, requires flanges and is only about 65% efficient whereas the cover-type member uses 100% of its exposed area.

Another type of operation of the present invention is possible by substantially increasing the force of the springs 158 so that the cover automatically moves to the right to shut off vacuum to the governor whenever the manifold vacuum drops to 3–4 inches of mercury, for example. Then, whenever the accelerator is depressed for fast acceleration which lowers the manifold vacuum below this value, the knob 160 automatically is moved to its rightward position to render the governor mechanism inoperative. This arrangement of my invention tends to discourage "jack-rabbit" starts and "hot rod" acceleration, thereby to improve fuel economy and safety.

Still another possible modification of the present invention is to vary the force of spring 51 in several ways, in addition to varying the length of shaft 49. The extension portion of shaft 49 to the right of abutment 49a can be long enough to close valve 110 exactly when valve 48 opens. Then, the governor action does not start until the exact preset speed is obtained, in contrast to the slight automatic acceleration when valve 110 closes slightly ahead of the opening of valve 48.

Also, the shaft extension can be made even shorter than illustrated in FIG. 1 and the spring 51 can be selected so that valve 110 closes at a difinite difference in speed, such as 20 m.p.h. less than the preset speed which is attained when valve 48 opens. In this instance, the driver accelerates the vehicle part way manually until he hears clicker 33, and he then can remove his foot from the accelerator. The diaphragm then automatically accelerates the vehicle to the governed speed during the last 20 m.p.h. of the speed setting and automatically regulates the speed thereafter.

A characteristic of manifold vacuum, as discussed previously, is utilized to enable relatively slow automatic-acceleration following such automatic activation or engagement. In all carbureted engines, the manifold vacuum reduces from about 19 inches of mercury at no-load to about 1–2 inches of mercury at full-load as the throttle is opened. Such automatic acceleration is accomplished by the device shown in FIG. 1, according to the present invention, by selecting the spring 46 so that the diaphragm vacuum in chamber 44 is never more than a preselected value, such as 5 or 6 inches of mercury for example, which is a minimum for the manifold vacuum in this instance. The throttle opening at the minimum manifold vacuum corresponding to this maximum diaphragm vacuum restricts the acceleration rate sufficiently to enable safe automatic acceleration. If the spring 46 is selected to provide a working (maximum) diaphragm vacuum of 8–9 inches of mercury (or higher), the acceleration rate is even slower after automatic-activation. However, this desirable result is accomplished at the expense of reducing further the engine power at which the governed speed can be maintained.

In the form of control system shown in FIG. 1, a "double-abutment" or "double-override" linkage mechanism is provided. With this system, constructed as described above, when the governor override unit 28 is engaged, as in FIG. 1, the accelerator override 35 enables the accelerator and its entire linkage (elements 20 and 21) to be biased by spring 24 to stand in their idle position. Since the friction and inertia of the accelerator and its linkage does not have to be overpowered by the speed governor mechanism, the size of servo-motor 7 can be substantially reduced. A smaller servo-motor will respond faster, since for example, in the form shown in FIG. 1, less air must be displaced. Any servo-motor, regardless of the type of energy used therein, can be made to respond faster by reducing its size providing the required forces are reduced. With a faster response, a speed governor mechanism is more stable without "hunting." An optional advantage of the double-abutment system is to maintain the size of the servo-motor, but select spring 46 to operate at much lower manifold vacuum; then the regulator maintains the set speed at higher engine power.

If the lost-motion unit 35 is replaced by a pin connection, then diaphragm 40 must operate link 21 and accelerator 20 in its speed-regulating movements. If desired any of the typical chain or cable lost-motion means may be employed for the override units 28 or 35.

A second restraining means is illustrated in FIG. 1 which can be used as a main restraining means if desired; but most likely in the instant case it would serve as a second restraining means to increase safety if any customer believes it worth the extra expense. In FIG. 1, a solenoid 210 has its plunger 212 connected to close a valve 214 in tube 120 against the opening force of a spring 216. The solenoid is energized to close valve 214 when a vehicle door 218 is opened, which closes the usual switch 220 for energizing the conventional dome light 222. Thus when the door is opened at any time, all vacuum is cut off so that the selector means moves into the position shown in FIG. 3a; and knob 160 must be deliberately pulled again to set the device ready for operation (FIG. 1). This same release occurs every time the ignition is shut off as above explained. Hence, in the form of the invention shown in FIG. 1, the second restraining means does not appear essential in view of the extra cost, but may be provided if desired.

Several reversals or changes of the elements in FIGS. 1–4 may be made without departing from the scope of the invention. For example, valve 150 could take many forms. It could be larger to seat on orifice 148 or slide therethrough; or it could be separate from shaft 152 biased closed, as by a spring, etc. Also, the cover 130 could be a plate and element 128 could be cup-shaped. Or the nipples 144 and 146 could be part of plate 128 by connecting shaft 152 to cover 130 and reversing the action of restrictor 154.

FIG. 5 shows a simplified form of pilot valve in which a valve-body 48a does not seat on orifice 54a but passes therethrough as the vehicle speed reduces below the preset governed speed. The valve-body illustrated herein is spherical or a ball but is cut off on the left side, slightly to the left of the center of the ball. When the speed reduces below the preset speed, the flat left end of valve body 48a is caused to pass by orifice 54a to bleed air into the tube 56 to prevent the governor mechanism from operating until the preset speed is attained. When this preset speed is almost attained, the valve is closed (as shown) for a few miles per hour during which time a short automatic acceleration is produced, as previously described. Then the valve body is moved to the left of orifice 54a by diaphragm 74 as the speed increases to the preset value; and then the right side of the valve body modulates air pressure to produce automatic speed-regulating movements of diaphragm 40, as previously explained. If desired, a second parallel leaf spring 234 may be secured to shaft 49 to support valve body 48a for frictionless movements. The leaf springs and/or the orifice 54a may be selected to provide a slight perimetrical clearance of the valve body in relation to its orifice. However, only spring 50 will suffice by locating this spring as close as possible to the valve body, particularly if the ball shape is used for the pilot valve. Any shape of valve may be employed but preferably the valve is contoured to modulate on its right side and is cut off on its left side to produce a relatively sudden change of pressure, as viewed in FIG. 5.

FIG. 6 shows a simplified form of brake actuated shut-off valve in which the tubes 61' and 61 are one and the same and made of rubber hose. The rubber tube or hose is inserted through apertures provided in a pinch clamp 226 having a base 228 suitably secured to clamp 176 attached to the steering post 174. The clamp also includes a hinged pinching arm 230 connected to base 228 by a pin 232 for angular movements. The arm 230 includes a cam portion 230a disposed to be adjacent the brake arm 11 when free and the tube 61 is open. When the brake pedal 10 is depressed, the arm 11 cams arm 230 upwardly, as viewed in FIG. 6, to pinch the hose 61 shut. Since no air-vent is provided in this valve construction the seat of one of valves 48, 104 or 110 is notched slightly to provide a slight leakage to be sure the throttle is closed when the brake pedal is depressed. This same type of cam action may be used with the valve shown in FIG. 1, if desired, so that no brackets are secured to brake arm 11.

What I claim is:

1. In a speed control device for an automotive vehicle including an engine having control means therefor, said vehicle also including a source of fluid subjected to pressure produced as a result of operation of the vehicle, the combination comprising; mechanism including a member operated by at least a portion of said pressure to regulate the position of said control means for establishing the speed of the vehicle, rigid pressure-sensitive means subjectable to said source pressure for producing forces to maintain the transmission of said pressure portion to said pressure-operated member, manual means operated by the vehicle-driver to subject said pressure-sensitive member to said source pressure, valve means operatively connected to said manually operated means for movements thereby independent of said pressure sensitive means to vent said last-named pressure to fluid at atmospheric pressure for dissipating said last-named pressure, and means acting on said pressure-sensitive means upon said dissipation of said source pressure to preclude said pressure from acting on said pressure-operated member until said pressure-sensitive means is again subjected to said source pressure upon deliberate operation of said manual means by the vehicle-driver.

2. In a speed control device for an automotive vehicle including an engine having control means therefor, and including vehicle brake-actuating means, said vehicle also including a source of fluid subjected to pressure produced as a result of operation of the vehicle, the combination comprising; mechanism including a fluid servo-motor controlled by a pilot valve responsive to changes in the speed of the vehicle and subjectable to at least a portion of said pressure to regulate the position of said control means for establishing the speed of the vehicle, valve means for directing said fluid pressure-portion to said pilot valve, manual means for operating said valve means, pressure-sensitive means subjected to said fluid pressure when said valve means is opened by said manual means to produce pressure-caused forces acting on itself for maintaining said valve means in said open position as long as said pressure is produced, release means operated by said brake-actuating means upon normal movements thereof to render said regulator mechanism inactive, second valve means operated by said manually-operated means while said pressure-sensitive means is stationary to dissipate said fluid pressure acting thereon, and means acting on said pressure-sensitive means upon said dissipation of said source pressure to automatically cause closure of said first-named valve means for precluding said source pressure from said pilot valve and said pressure-sensitive means until said first-named valve means is again manually opened deliberately by the vehicle-driver, to establish pressure acting on said pressure-sensitive means.

3. In a speed control device for an automotive vehicle including an engine having control means therefor and including vehicle brake-actuating means, said vehicle also including a source of air under vacuum produced as a result of operation of the engine, the combination comprising; a regulator mechanism responsive to a signal accompanying a change in vehicle speed and including a member operated by at least a portion of said vacuum for causing automatic regulating movements of said control means in a direction to maintain a preselected vehicle speed; an air circuit communicating with said source of vacuum and said vacuum-operated member to transmit said vacuum-portion thereto; valve means in said circuit having two positions thereof to open or close said circuit for enabling or precluding, respectively, said transmission of said vacuum to said vacuum-operated member; vacuum-sensitive means in said circuit subjectable to said vacuum therein and operatively associated with said valve means; biasing means acting on said vacuum-sensitive means in a direction to cause said valve means to close; movable manual means in an active position thereof disposed to open said valve means for applying said vacuum to said vacuum-sensitive means for enabling same to overpower said biasing means and maintain said valve means open as long as vacuum is applied to said vacuum-sensitive means; said manually operated means including means manually movable in relation to said vacuum-sensitive means for enabling selective manual release thereof under conditions of high values of said source vacuum, release means including second valve means in said circuit between said member and said fluid source operated by said brake-actuating means upon normal movements thereof for rendering said regulator mechanism inactive; said biasing means providing sufficient force to overpower said vacuum-sensitive means when said vacuum dissipates upon inactivation of the engine to automatically cause said first-named valve means to close and to automatically reset said manual means to an inactive position, until said manual means is moved by the vehicle-driver to its active position at least once after starting the engine.

4. The combination of means defined in claim 3, and second valve means in said circuit between said vacuum-sensitive means and said vacuum-operated member; said release means upon actuation of said brake-actuating means acting to cause said second valve means to close and shut off the vacuum to said vacuum-operated member but not to said vacuum-sensitive means; said second valve means being disposed to open the vacuum to said vacuum-operated member when said brake-actuating means is released; said regulator mechanism including third valve means responsive to said signal to bleed air into said circuit for controlling the vacuum therein acting on said vacuum-operated member to cause movements thereof in a direction to restore the said preselected speed during said automatic regulation of said control means; said third valve means including means operable in response to said signal before a predetermined speed is attained to bleed air into said circuit for reducing the vacuum acting on said vacuum-operated member to prevent same from operating said control means, and said last-named means being disposed to terminate said second-named air bleed when said predetermined speed is attained by normal advancement of said control means by the vehicle-driver.

5. In a speed control device for an automative vehicle including an engine having control means therefor, and including vehicle brake-actuating means, said vehicle also including a source of air subjected to vacuum produced as a result of operation of the engine, the combination comprising; mechanism including a member operated by at least a portion of said vacuum to regulate the position of said control means for establishing the speed of the vehicle, valve means for directing said vacuum-portion to said vacuum-operated member, manual means for operating said valve means, a chamber subjectable to said vacuum, pressure-sensitive means comprising at least one wall of said chamber and movable in relation to the other walls of said chamber for closing said chamber or opening same to the surrounding atmosphere, said movable wall being disposed to close said chamber when said valve means is opened by said manual means to produce vacuum-caused forces acting on itself for maintaining said valve means in said open position as long as said vacuum is produced by the vehicle engine, said manually operated means including air bleed valve means manually movable in relation to said movable wall to initially bleed atmospheric air thereto for diminishing the vacuum to enable selective manual release under conditions of high values of said source vacuum, release means operated by said brake-actuating means upon normal movements thereof to render said regulator mechanism inactive, and means acting on said movable wall upon dissipation of said source vacuum to automatically cause closure of said first-named valve means for precluding said source vacuum from said vacuum-operated member and said movable wall until said first-named valve means is again manually opened deliberately by the vehicle-driver, to establish vacuum acting on said movable wall.

6. In a speed control device for an automotive vehicle including an engine having control means therefor and including vehicle brake-actuating means, said vehicle also including a source of air under vacuum produced as a result of operation of the engine, the combination comprising; a regulator mechanism responsive to a signal accompanying a change in vehicle speed and including a member operated by at least a portion of said vacuum for causing automatic regulating movements of said control means in a direction to maintain a preselected vehicle speed; an air circuit communicating with said source of vacuum and said vacuum-operated member to transmit said vacuum-portion thereto; valve means in said circuit having two positions thereof to open or close said circuit for enabling or precluding, respectively, said transmission of said vacuum to said vacuum-operated member; a chamber in said circuit subjectable to said vacuum, rigid pressure-sensitive means operatively associated with said valve means and normally open to the surrounding atmosphere about its entire perimeter in its inoperative position, said pressure-sensitive means comprising at least one wall of said chamber and movable in relation to the other walls thereof for closing said chamber or opening same to the surrounding atmosphere; biasing means acting on said movable wall in a direction to cause said valve means to close; movable manual means in an active position thereof disposed to open said valve means for enabling applying said vacuum to said movable wall for enabling same to overpower said biasing means and maintain said valve means open as long as vacuum is applied to said movable wall; second valve means operatively associated with said first-named valve means and movable independently of said pressure-sensitive member but controlled by said manual means to vent said chamber to atmosphere at the discretion of the vehicle-driver, release means operated by said brake-actuating means upon normal movements thereof for rendering said regulator mechanism inactive; said biasing means providing sufficient force to overpower said movable wall when said vacuum dissipates upon inactivation of the engine or when said driver operates said second-named valve means to automatically cause said first-named valve means to close and to automatically reset said manual means to an inactive position, until said manual means is moved by the vehicle-driver to its active position at least once after starting the engine.

7. In a speed control device for an automotive vehicle including an engine having control means therefor, and including vehicle brake-actuating means, said vehicle also including a source of air subjected to vacuum produced as a result of operation of the engine, the combination comprising; mechanism including fluid servo-motor controlled by a pilot valve responsive to changes in the speed of the vehicle and subjectable to at least a portion of said vacuum to regulate the position of said control means for establishing the speed of the vehicle, valve means for directing said vacuum-portion to said pilot valve, manual means for operating said valve means, vacuum-sensitive means subjected to said vacuum when said valve means is opened by said manual means to produce vacuum-caused forces acting on itself for maintaining said valve means in said open position as long as said vacuum is produced, said regulator mechanism including second valve means between said vacuum-sensitive means and said pilot valve and operatively connected to said control means for movement therewith to affect said vacuum-portion between said second valve means and said pilot valve as a result of changes in the position of said control means for affecting operation of said servo-motor, release means operated by said brake-actuating means upon normal movements thereof to render said regulator mechanism inactive, and means acting on said vacuum-sensitive means upon dissipation of said source vacuum to automatically cause closure of said first-named valve means for precluding said source vacuum from said vacuum-operated member and said vacuum-sensitive means until said first-named valve means is again manually opened deliberately by the vehicle-driver, to establish vacuum acting on said vacuum-sensitive means.

8. In a speed control device for an automotive vehicle including an engine having control means therefor and including vehicle brake-actuating means, said vehicle also including a source of air under vacuum produced as a result of operation of the engine, the combination comprising; a regulator mechanism responsive to a signal accompanying a change in vehicle speed and including a member operated by at least a portion of said vacuum for causing automatic regulating movements of said control means in a direction to maintain a preselected vehicle speed; an air circuit communicating with said source of vacuum and said vacuum-operated member to transmit said vacuum-portion thereto; valve means in said circuit having two positions thereof to open or close said circuit for enabling or precluding, respectively, said transmission of said vacuum to said vacuum-operated member; a chamber in said circuit subjectable to said vacuum, vacuum-sensitive means operatively associated with said valve means and comprising at least one wall of said chamber, said movable wall having a rectangular shape and being movable in relation to the other walls thereof for closing said chamber or opening same to the surrounding atmosphere; biasing means acting on said movable wall in a direction to cause said valve means to close; movable manual means in an active position thereof disposed to open said valve means for applying said vacuum to said movable wall for enabling same to overpower said biasing means and maintain said valve means open as long as vacuum is applied to said movable wall; second valve means in said circuit including release means operated by said brake-actuating means upon normal movements thereof to cause operation of said second valve means for rendering said regulator mechanism inactive; said biasing means providing sufficient force to overpower said movable wall when said vacuum dissipates upon inactivation of the engine to automatically cause said first-named valve means to close and to automatically reset said manual means to an inactive position, until said manual means is moved by the vehicle-driver to its active position at least once after starting the engine.

9. In a speed control device for an automotive vehicle including an engine having control means therefor, and including vehicle brake-actuating means, said vehicle also including a source of fluid subjected to pressure produced as a result of operation of the engine, the combination comprising; mechanism including a member operated by at least a portion of said pressure to regulate the position of said control means for establishing the speed of the vehicle, valve means for directing said fluid pressure-portion to said pressure-operated member, manual means for operating said valve means, pressure-sensitive means subjected to said fluid pressure when said valve mean is opened by said manual means to produce pressure-caused forces acting on itself for maintaining said valve means in said open position as long as said pressure is produced, release means operated by said brake-actuating means upon normal movements thereof to render said regulator mechanism inactive, and means acting on said pressure-sensitive means upon dissipation of said source pressure when said engine is inactivated to automatically cause closure of said valve means for precluding said source pressure from said pressure-operated member and said pressure-sensitive means until said valve means is again manually opened deliberately by the vehicle-driver, to establish pressure acting on said pressure-sensitive means, second valve means operatively associated with said first-named valve means and movable independently of said pressure sensitive means and opened upon reverse operation of said manual means by the vehicle-driver any time he chooses for precluding said source pressure from said pressure-operated member until said first-named valve means is again manually opened deliberately by the driver while closing said second-named valve means.

10. In a speed control device for an automotive vehicle including an engine having control means therefor adapted to increase vehicle speed upon advancing movements thereof, and including vehicle brake-actuating means, said vehicle also including a source of fluid subjected to pressure produced as a result of operation of the engine, the combination comprising; a regulator mechanism responsive to a signal accompanying a change in vehicle speed and including a member operated by at least a portion of said pressure for causing automatic-regulating movements of said control means in a direction to maintain a preselected vehicle speed, a fluid circuit having inlet and outlet restrictions for controlling said pressure-portion acting on said pressure-operated member, said inlet restriction including a pilot valve member responsive to said signal to modulate the restrictive effect of said inlet restriction for producing said automatic regulating movements, said outlet restriction including an outlet valve member operated by said control means, upon advancing movements thereof to decrease the restrictive effect of said outlet restriction, and conversely, valve means for directing said fluid pressure-portion to said outlet valve member, manual means for operating said valve means, pressure-sensitive means subjected to said fluid pressure when said valve means is opened by said manual means to produce pressure-caused forces acting on itself for maintaining said valve means in said open position as long as said pressure is produced, release means operated by said brake-actuating means upon normal movements thereof to render said regulator mechanism inactive but not inoperative to operate said control means without affecting said pressure acting on said pressure-sensitive means, automatic activating means associated with said regulator mechanism and responsive to said signal to establish said automatic regulation of said control means by said regulator mechanism when said vehicle speed attains a predetermined value, and means acting on said pressure-sensitive means upon dissipation of said source pressure to automatically cause closure of said valve means for precluding said source pressure from said pressure-operated member and said pressure-sensitive means until said valve means is again manually opened deliberately by the vehicle-driver, to establish pressure acting on said pressure-sensitive means.

11. In a speed control device for an automotive vehicle including an engine having control means therefor and including vehicle brake-actuating means, said vehicle also including a source of air under vacuum produced as a result of operation of the engine, the combination comprising; a regulator mechanism responsive to a signal accompanying a change in vehicle speed and including a member operated by at least a portion of said vacuum for causing automatic regulating movements of said control means in a direction to maintain a preselected vehicle speed; an air circuit communicating with said source of vacuum and said vacuum-operated member to transmit said vacuum-portion thereto; valve means in said circuit having two positions thereof to open or close said circuit for enabling or precluding, respectively, said transmission of said vacuum to said vacuum-operated member; vacuum-sensitive means in said circuit subjectable to said vacuum therein and operatively associated with said valve means; biasing means acting on said vacuum-sensitive means in a direction to cause said valve means to close; movable manual means in an active position thereof disposed to open said valve means for applying said vacuum to said vacuum-sensitive means for enabling same to overpower said biasing means and maintain said valve means open as long as vacuum is applied to said vacuum-sensitive means; second valve means in said circuit between said vacuum-sensitive means and said vacuum-operated member, release means operated by said brake-actuating means upon normal movements thereof to cause said second valve means to close and shut off the vacuum transmitted to said vacuum-operated member but not to said vacuum-sensitive means; said second valve means being disposed to again open the vacuum to said vacuum-operated member when said brake-actuating means is released; said regulator mechanism including means to prevent said vacuum in said circuit from actuating said vacuum-operated member until the vehicle speed attains a predetermined value; said biasing means providing sufficient force to overpower said vacuum-sensitive means when said vacuum dissipates upon inactivation of the engine to automatically cause said first-named valve means to close and to automatically reset said manual means to an inactive position, until said manual means is moved by the vehicle-driver to its active position at least once after starting the engine.

12. In a speed control device for an automotive vehicle including an engine having control means therefor, and including vehicle brake-actuating means, said vehicle also including a source of fluid subjected to pressure produced as a result of operation of the engine, the combination comprising; a regulator mechanism reponsive to a signal accompanying a change in vehicle speed and including a member operated by at least a portion of said pressure for causing automatic regulating movements of said control means in a direction to maintain a preselected vehicle speed, valve means for directing said fluid pressure-portion to said pressure-operated member, manual means for operating said valve means, pressure-sensitive means subjected to said fluid pressure when said valve means is opened by said manual means to produce pressure-caused forces acting on itself for maintaining said valve means in said open position as long as said pressure is produced, second valve means between said pressure-sensitive means and said pressure-operated member, release means operated by said brake-actuating means upon normal movements thereof to cause said second valve means to close and shut off the pressure transmitted to said pressure-operated member but not to said pressure-sensitive means, said second valve means being disposed to open the pressure to said pressure-operated member when said brake-actuating means is released, said regulator mechanism including third valve means responsive to said signal to control pressure from said circuit acting on said pressure-operated member in a direction to restore said preselected speed during said automatic regulation of said control means, and said valve means including means operable before a predetermined speed is attained to change the pressure acting on said pressure-operated member for precluding same from operating said control means until said predetermined speed is attained by normal advancement of the control means by the vehicle-driver, and means acting on said pressure-sensitive means upon dissipation of said source pressure to automatically cause closure of said first-named valve means for precluding said source pressure from said pressure-operated member and said pressure-sensitive means until said first-named valve means is again manually opened deliberately by the vehicle-driver, to establish pressure acting on said pressure-sensitive means.

13. In a speed control device for an automotive vehicle including an engine having control means therefor normally retarded to decrease vehicle-speed, and conversely, and including vehicle brake-actuating means, the combination comprising; a regulator mechanism for causing automatic regulating movements of said control means in a direction tending to maintain a preselected vehicle speed, said regulator mechanism including a pressure-responsive member operatively connected to said control means for effecting said speed-regulating movements thereof, a fluid circuit having a flow of fluid therethrough and communicating with said pressure-responsive member, valve means in said circuit for controlling fluid pressure therein acting on said pressure-responsive member for causing said movements thereof in a direction to retard said control means after said preselected speed is attained and when the vehicle speed tends to exceed said preselected speed, and conversely, to provide said automatic regulation of said control means, sensing means responsive to changes in a signal accompanying a change in vehicle speed to produce forces acting on said valve means for causing speed-controlling movements thereof, second valve means controlled by said sensing means before a predetermined speed is attained to change the pressure acting on said pressure-responsive member for precluding same from operating said control means until said predetermined speed is attained after normal advancement of the control means by the vehicle-driver, and release means operable independently of said second valve means and operated by said brake-actuating means upon normal movements thereof for rendering said regulator mechanism inactive.

14. In a speed control device for an automotive vehicle including an engine having control means therefor normally retarded to decrease vehicle speed, and conversely, and including vehicle brake-actuating means, said vehicle also including a source of fluid pressure produced as a result of operation of the vehicle, the combination comprising; a regulator mechanism responsive to a signal accompanying a change in vehicle speed for causing automatic regulating movements of said control means to maintain a preselected vehicle speed; said regulator mechanism including a pressure-responsive member operatively connected to said control means for effecting said speed-regulating movements thereof; a fluid circuit communicating with said pressure-responsive member and with said source of pressure for inducing a flow of fluid through the circuit; valve means in said circuit responsive to said signal to bleed fluid in relation to said circuit after said preselected speed is attained for controlling the pressure from said circuit acting on said pressure-responsive member, to advance said control means when the vehicle speed falls below said preselected value, and conversely, to provide said automatic regulation of said control means; said valve means including second valve means operable in response to said signal before a predetermined speed is attained to bleed fluid in relation to said circuit for changing the pressure acting on said pressure-responsive member to prevent same from operating said control means; said second valve means being disposed to terminate said second-named fluid bleed when said predetermined speed is attained after normal advancement of said control means by the vehicle-driver; and release means operated by said brake-actuating means upon normal movements thereof for rendering said regulator mechanism inactive.

15. In a speed control device for an automotive vehicle including an engine having control means therefor normally retarded to decrease vehicle speed, and conversely, and including vehicle brake-actuating means, said vehicle also including a source of air under vacuum produced as a result of operation of the engine, the combination comprising; a regulator mechanism responsive to a signal accompanying a change in vehicle speed for causing automatic regulating movements of said control means to maintain a preselected vehicle speed; said regulator mechanism including a vacuum-responsive member operatively connected to said control means for effecting said speed-regulating movements thereof; an air circuit having inlet and outlet orifices communicating with said vacuum-responsive member and with said source of vacuum for inducing a flow of fluid through the circuit; said inlet orifice including valve means in said circuit responsive to said signal to bleed air into said circuit after said preselected speed is attained for controlling the vacuum from said circuit acting on said vacuum-responsive member, to advance said control means when the vehicle speed falls below said preselected value, and conversely, to provide said automatic regulation of said control means; said valve means including means operable in response to said signal before a predetermined speed is attained to bleed air into said circuit for reducing the vacuum acting on said vacuum-responsive member to prevent same from operating said control means; said last-named signal responsive means being disposed to terminate said second-named air bleed when said predetermined speed is attained after normal advancement of said control means by the vehicle-driver; said outlet orifice including second valve means operated by said control means upon movements thereof to change the restrictive effect of said outlet orifice; and release means operated by said brake-actuating means upon normal movements thereof for rendering said regulator mechanism inactive.

16. In a speed control device for an automotive vehicle including an engine having control means therefor normally retarded to decrease vehicle-speed, and conversely, and including vehicle brake-actuating means, the combination comprising; a regulator mechanism for causing automatic regulating movements of said control means in a direction tending to maintain a preselected vehicle speed, said regulator mechanism including a pressure-responsive member operatively connected to said control means for effecting said speed-regulating movements thereof, a fluid circuit having a flow of fluid therethrough and communicating with said pressure-responsive member, valve means in said circuit for controlling fluid pressure therein acting on said pressure-responsive member for causing said movements thereof in a direction to retard said control means after said preselected speed is attained and when the vehicle speed tends to exceed said preselected speed, and conversely, to provide said automatic regulation of said control means, sensing means responsive to changes in a signal accompanying a change in vehicle speed to produce forces acting on said valve means for effecting speed-controlling movements thereof, second valve means controlled by said sensing means before a predetermined speed is attained to change the pressure acting on said pressure-responsive member for precluding same from operating said control means until said predetermined speed is attained after normal advancement of the control means by the vehicle-driver, and release means including third valve means controlling pressure in said circuit and operated by said brake-actuating means upon normal movements thereof for rendering said regulator mechanism inactive.

17. In a speed control device for an automotive vehicle including an engine having control means therefor normally retarded to decrease vehicle speed, and conversely, and including vehicle brake-actuating means, said vehicle also including a source of fluid pressure produced as a result of operation of the vehicle, the combination comprising; a regulator mechanism responsive to a signal accompanying a change in vehicle speed for causing automatic regulating movements of said control means to maintain a preselected vehicle speed; said regulator mechanism including a pressure-responsive member operatively connected to said control means for effecting said speed-regulating movements thereof; a fluid circuit communicating with said pressure-responsive member and with said source of pressure for inducing a flow of fluid through the circuit; valve means in said circuit responsive to said signal to bleed fluid in relation to said circuit after said preselected speed is attained for controlling the pressure from said circuit acting on said pressure-responsive member, to advance said control means when the vehicle speed falls below said preselected value, and conversely, to provide said automatic regulation of said control means; said valve means including a valve element and an orifice element, one of said elements being movable in response to said signal in relation to the other said element in one direction to stand on one side thereof for producing said first-named fluid bleed; said one element being movable in a direction opposite to said first direction to pass by said other element and stand on the opposite side of said other element in response to said signal before a predetermined speed is attained to bleed fluid in relation to said circuit for changing the pressure acting on said pressure-responsive member to prevent same from operating said control means; said movable valve element being disposed to terminate said second-named fluid bleed when said predetermined speed is attained after normal advancement of said control means by the vehicle-driver; and release means operated by said brake-actuating means upon normal movements thereof for rendering said regulator mechanism inactive.

18. In a speed control device for an automotive vehicle including an engine having control means therefor normally retarded to decrease vehicle speed, and conversely, and including vehicle brake-actuating means, said vehicle also including a source of fluid pressure produced as a result of operation of the vehicle, the combination comprising; a regulator mechanism responsive to a signal accompanying a change in vehicle speed for causing automatic regulating movements of the said control means to maintain a preselected vehicle speed; said regulator mechanism including a pressure-responsive member operatively connected to said control means for effecting said speed-regulating movements thereof; a fluid circuit communicating with said pressure-responsive member and with said source of pressure for inducing a flow of fluid through the circuit; valve means in said circuit including a first valve portion responsive to said signal to bleed fluid in relation to said circuit after said preselected speed is attained for controlling the pressure from said circuit acting on said pressure-responsive member, to advance said control means when the vehicle speed falls below said preselected value, and conversely, to provide said automatic regulation of said control means; a valve means including a second valve portion operable in response to said signal before said predetermined speed is attained to bleed fluid in relation to said circuit for changing the pressure acting on said pressure-responsive member to prevent same from operating said control means; said second valve portion being disposed to terminate said second-named fluid bleed when said predetermined speed is attained after normal advancement of said control means by the vehicle-driver; said first valve portion having a configuration to modulate pressure for controlling said first-named fluid bleed, said second valve portion having a configuration to provide a relatively sudden change in restrictive effect for controlling said second-named fluid bleed; and release means operated by said brake-actuating means upon normal movements thereof for rendering said regulator mechanism inactive.

19. In a speed control device for an automotive vehicle including an engine having control means therefor normally retarded to decrease vehicle speed, and conversely, and including vehicle brake-actuating means, said vehicle also including a source of fluid pressure produced as a result of operation of the vehicle, the combination comprising; a regulator mechanism responsive to a signal accompanying a change in vehicle speed for causing automatic regulating movements of said control means to maintain a preselected vehicle speed; said regulator mechanism including a pressure-responsive member operatively connected to said control means for effecting said speed-regulating movements thereof; a fluid circuit communicating with said pressure-responsive member and with said source of pressure for inducing a flow of fluid through the circuit; valve means including a movable valve portion in said circuit responsive to said signal to bleed fluid in relation to said circuit after said preselected speed is attained for controlling the pressure from said circuit acting on said pressure-responsive member, to advance said control means when the vehicle speed falls below said preselected value, and conversely, to provide said automatic regulation of said control means; said valve means including substantially frictionless leaf spring swingable means imparting rigidity in all except one direction and acting to support said movable valve portion for substantially frictionless movements in said one direction; said valve means including means operable in response to said signal before a predetermined speed is attained to bleed fluid in relation to said circuit for changing the pressure acting on said pressure-responsive member to prevent same from operating said control means; said last-named means being disposed to terminate said second-named fluid bleed when said predetermined speed is attained after normal advancement of said control means by the vehicle-driver; release means operated by said brake-actuating means upon normal movements thereof for rendering said control means inactive.

20. In a speed control device for an automotive vehicle including an engine having control means therefor normally retarded to decrease vehicle-speed, and conversely, and also including an element manually movable by the vehicle driver incident to normal operation of the vehicle, and including vehicle brake-actuating means, the combination comprising; a regulator mechanism for causing automatic regulating movements of said control means in a direction tending to maintain a preselected vehicle speed, said regulator mechanism including a pressure-responsive member operatively connected to said control means for effecting said speed-regulating movements thereof, a fluid circuit having a flow of fluid therethrough and communicating with said pressure-responsive member, valve means in said circuit for controlling fluid pressure therein acting on said pressure-responsive member for causing said movements thereof in a direction to retard said control means after said preselected speed is attained and when the vehicle speed tends to exceed said preselected speed, and conversely, to provide said automatic regulation of said control means, sensing means responsive to changes in a signal accompanying a change in vehicle speed to produce forces acting on said valve means for effecting speed-controlling movements thereof, second valve means including a valve member movable in response to said forces of said sensing means before a predetermined speed is attained to change the pressure acting on said pressure-responsive member for precluding same from operating said control means until said predetermined speed is attained upon normal advancement of the control means by the vehicle-driver, said sensing means being operatively connected to said movable valve member and acting on said member to cause said movements thereof, release means operated by said brake-actuating means upon normal movements thereof for rendering said regulator mechanism inactive, and restraining means including movable means operable as a result of said movement of said element for rendering said mechanism inoperative, to prevent inadvertent activation of said mechanism until deliberately activated by the vehicle-driver.

21. In a speed control device for an automotive vehicle including an engine having control means therefor normally advanced to increase vehicle-speed, and conversely, and including vehicle brake-actuating means in a driver's compartment, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, said regulator mechanism including adjustable means for establishing said preselected speed of said vehicle, and manually operated speed selector means mounted to a portion of said vehicle in said driver's compartment, said speed selector means including gear means manually rotatable about its own axis by the vehicle-driver, arcuate rack means operated by rotation of said gear means and pivoted for angular movements about an axis transverse to said axis of said gear means, said rack means including an actuating portion disposed for movements along an arcuate path about said transverse axis, shaft means operatively connecting said actuating portion and said adjustable means, whereby manual rotation of said gear means operates said adjusting means to establish said preselected speed, and release means operated by said brake-actuating means upon normal movements thereof for rendering said regulator mechanism inactive to transmit said forces to said control means.

22. In a speed control device for an automotive vehicle including an engine having control means therefor normally advanced to increase vehicle-speed, and conversely, and including vehicle brake-actuating means in a driver's compartment, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, said regulator mechanism including adjustable means for establishing said preselected speed of said vehicle, and manually operated speed selector means mounted to a portion of said vehicle in said driver's compartment, said speed selector means including gear means manually rotatable about its own axis by the vehicle-driver, arcuate rack means operated by rotation of said gear means and pivoted for angular movements about an axis transverse to said axis of said gear means, said rack means including an actuating portion disposed for movements along an arcuate path about said transverse axis, shaft means operatively connecting said actuating portion and said adjustable means, said selector means including a manual element rotatable with said gear means, stop means operatively associated with said selector means to limit said rotation of said manual element to not more than substantially one complete turn, said manual element including a single tactile portion adjacent its periphery for indicating the angular position of said one turn of said element to enable the vehicle-driver to establish said preselected speed by feeling said angular position of said tactile portion without removing his sight from the road.

23. In a speed control device for an automotive vehicle including an engine having control means therefor and having vehicle brake-actuating means, said vehicle also including a source of fluid pressure as a result of operation of the engine, the combination comprising; mechanism including a member operated by at least a portion of said pressure to regulate the position of said control means for establishing the speed of the vehicle, a flexible tube for directing said fluid pressure to said pressure-operated member, pinch-clamp means operatively associated with said tube and disposed to squeeze same closed, and release means operated by said brake-actuating means upon normal movements thereof to cause said pinch-clamp means to squeeze said tube for shutting off said pressure to said pressure-operated member.

24. In a speed control device for an automotive vehicle including an engine having control means therefor normally advanced to increase vehicle-speed, and conversely, and including vehicle brake-actuating means, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, said mechanism including activating means responsive to said signal and operated automatically upon attaining a predetermined vehicle speed to automatically effect activation of said mechanism with respect to said control means after said advancement thereof by the vehicle-driver, means operated by said brake-actuating means upon normal movements thereof for rendering said regulator mechanism inactive to transmit said forces to said control means, and sound-producing means including a leaf spring clicker element operatively associated with said activating means to produce a temporary signal audible to the vehicle-driver when said automatic activation of said mechanism is effected.

25. In a control device for regulating the speed of automotive vehicle including an engine having control means therefor, the combination of means to effect speed-regulating movements of said control means comprising, a pressure responsive member operatively connected to said control means for actuation thereof, a fluid circuit having a source of fluid pressure for the flow of fluid therethrough and having inlet and outlet restrictions therein, said pressure responsive member communicating with said circuit at a point between said two restrictions, valve means including a movable valve member cooperating with one of said restrictions to control the restrictive effect thereof for establishing the pressure between said two restrictions acting on said pressure responsive member, sensing means responsive to changes in the speed of said vehicle to produce forces acting on said valve member for effecting speed-regulating movements of said pressure responsive member and said control means, and said valve means including activating means operatively associated with said circuit and operable by said sensing means when said vehicle speed is below a predetermined value to modify pressure between said two restrictions for precluding operation of said pressure-responsive member until said predetermined speed is attained.

26. In a speed control device for an automotive vehicle including an engine having control means therefor, said vehicle also including a source of fluid pressure produced as a result of operation of the engine, the combination comprising; mechanism including a member operated by at least a portion of said pressure to regulate the position of said control means for establishing the speed of the vehicle, selector means between said pressure source and said pressure-operated member operable to open said member to the surrounding atmosphere, said selector means including a shiftable element having an area subjectable to said pressure source for providing a force to hold itself in a position to close said member from the surrounding atmosphere for subjecting same to said pressure-portion as long as said pressure source is produced, adjustable means operatively associated with said regulator mechanism to enable manual selection of said vehicle speed, said selector means including a single rotatable knob operatively connected to said speed adjusting means for providing said manual speed selection in rotary movements thereof and said single knob also being disposed to move said shiftable means into and out of said holding position in a direction different from said rotary direction.

27. In a speed control device for an automotive vehicle including an engine having control means therefor normally advanced to increase vehicle-speed, and conversely, and including vehicle brake-actuating means in a driver's compartment, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, said regulator mechanism including adjustable means for establishing said preselected speed of said vehicle, manually operated speed selector means mounted to a portion of said vehicle in said compartment, said speed selector means including gear means manually rotatable about its own axis by the vehicle-driver, angular rack means operated by rotation of said gear means and pivoted for angular movements about an axis transverse to said axis of said gear means, said rack means including an actuating portion disposed for movements along an arcuate path about said transverse axis, shaft means operatively connecting said actuating portion and said adjustable means, whereby manual rotation of said gear means operates said adjusting means to establish said preselected speed, said selector means including means to control the activation and inactivation of said automatic regulating movements of said control means, second shaft means operatively connected to said gear means to produce said rotary movements thereof, said second shaft means being axially movable in relation to said rack means, said last-named shaft means being operatively connected to said selector control means to enable said activation and inactivation in said axial movements, said second shaft means including single knob means disposed both for rotary movements to operate said speed adjusting means and for axial movements to operate said selector control means, and release means operated by said brake-actuating means upon normal movements thereof for rendering said regulator mechanism inactive to transmit said forces to said control means.

28. In a speed control device for an automotive vehicle including an engine having control means therefor normally advanced to increase vehicle-speed, and conversely, and including vehicle brake-actuating means in a driver's compartment, said vehicle also including a source of fluid pressure, the combination comprising; a regulator mechanism operatively associated with said control means and including a pressure responsive member adapted to produce forces acting on said control means in response to a signal accompanying a change in the speed of the vehicle to effect automatic regulating movements of said control means in a direction tending to maintain a preselected regulated speed of the vehicle, said regulator mechanism including adjustable means for establishing said preselected speed of said vehicle, and manually operated speed selector means mounted to a portion of said vehicle in said compartment, said speed selector means including gear means manually rotatable about its own axis by the vehicle-driver, angular rack means operated by rotation of said gear means and pivoted for angular movements about an axis transverse to said axis of said gear means, said rack means including an actuating portion disposed for movements along an arcuate path about said transverse axis, shaft means operatively connecting said actuating portion and said adjustable means, whereby manual rotation of said gear means operates said adjusting means to establish said preselected speed, said selector means including valve means movable into two positions to establish the availability of said source fluid pressure for said pressure responsive member, second shaft means operatively connected to said gear means to produce said rotary movements thereof, said second shaft means also being axially movable in relation to said rack means, said last-named shaft means being operatively connected to said valve means to enable said movements thereof from one of said positions to the other said position in said axial movements of said second shaft means, and release means operated by said brake-actuating means upon normal movements thereof for rendering said regulator mechanism inactive to transmit said forces to said control means.

29. In a speed control device for an automotive vehicle including an engine having control means therefor and including vehicle brake-actuating means, said vehicle also including a source of air under vacuum produced as a result of operation of the engine, the combination of; a regulator mechanism responsive to a signal accompanying a change in vehicle speed and including a member operated by at least a portion of said vacuum for causing automatic regulating movements of said control means in a direction to maintain vehicle speed; an air circuit communicating with said source of vacuum and said vacuum-operated member to transmit said vacuum-portion thereto; valve means in said circuit having two positions thereof to open or close said circuit for enabling or precluding, respectively, said transmission of said vacuum to said vacuum-operated member; vacuum-sensitive means in said circuit subjectable to said vacuum therein and operatively associated with said valve means; biasing means acting on said vacuum-sensitive means in a direction to cause said valve means to close; movable manual means in an active position thereof disposed to open said valve means for applying said vacuum to said vacuum-sensitive means for enabling same to overpower said biasing means and maintain said valve means open as long as vacuum is applied to said vacuum-sensitive means; a flexible tube for directing said air source to said vacuum-operated member; pinch-clamp means operatively associated with said tube and disposed to squeeze same closed; and release means operated by said brake-actuating means upon normal movements thereof to cause said pinch-clamp means to squeeze said tube for precluding said pressure from operating said pressure-operated member but not from said vacuum-sensitive means; said pinch clamp means being disposed to again open the vacuum to said vacuum-operated member when said brake-actuating means is released; said regulator mechanism including means to prevent said vacuum in said circuit from actuating said vacuum-operated member until the vehicle speed attains a predetermined value; said biasing means providing sufficient force to overpower said vacuum-sensitive means when said vacuum dissipates upon inactivation of the engine to automatically cause said valve means to close and to automatically reset said manual means to an active position, until said manual means is moved by the vehicle-driver to its active position at least once after starting the engine.

30. In a speed control device for an automotive vehicle including an engine having control means therefor normally retarded to decrease vehicle-speed, and conversely and including vehicle brake-actuating means, said vehicle including a source of fluid pressure, the combination of; a regulator mechanism for causing automatic regulating movements of said control means in a direction tending to maintain vehicle speed, said regulator mechanism including a pressure-responsive member operatively connected to said control means for effecting said speed-regulating movements thereof, a fluid circuit having a flow of fluid therethrough and communicating with said source of pressure and with said pressure-responsive member, valve means in said circuit for controlling fluid pressure therein acting on said pressure-responsive member for causing said movements thereof in a direction to retard said control means after said preselected speed is attained and when the vehicle speed tends to exceed said pre-selected speed, and conversely, to provide said automatic regulation of said control means, sensing means responsive to changes in a signal accompanying a change in vehicle speed to produce forces acting on said valve means for effecting speed-controlling movements thereof, said valve means including means operated by said sensing means before a predetermined speed is attained to change the pressure acting on said pressure-responsive member for precluding same from operating said control means until said predetermined speed is attained after normal advancement of the control means by the vehicle-driver, a flexible tube comprising at least a part of said fluid circuit for transmitting said fluid pressure from said source to said pressure-responsive member, pinch-clamp means operatively associated with said tube and disposed to squeeze same closed, and release means operated by said brake-actuating means upon normal movements thereof to cause said pinch-clamp means to squeeze said tube for precluding said pressure from operating said pressure-responsive member for rendering said regulator mechanism inactive.

31. In a speed control device for an automotive vehicle including an engine having control means therefor and having vehicle brake-actuating means with a suspended brake arm, said vehicle also including a source of fluid pressure as a result of operation of the vehicle, and said vehicle including a steering post, the combination of; mechanism including a member operated by at least a portion of said pressure to regulate the position of said control means for establishing the speed of the vehicle, a flexible tube for directing said fluid pressure to said pressure-operated member, pinch-clamp means operatively associated with said tube and disposed to squeeze same closed, release means operated by said brake-actuating means upon normal movements thereof to cause said pinch-clamp means to squeeze said tube for precluding said pressure from operating said pressure-operated member, and means to mount said pinch clamp means to said steering post to support same, said pinch clamp means having a cam portion disposed to ride against said brake arm to cause said squeezing action of said tube upon normal movements of said brake-actuating means.

32. In a speed control device for an automotive vehicle including an engine having control means therefor and having vehicle brake-actuating means, said vehicle also including a source of fluid pressure as a result of operation of the vehicle, the combination comprising; mechanism including a member operated by at least a portion of said pressure to regulate the position of said control means for establishing the speed of the vehicle, selector means between said pressure source and said pressure-operated member operable to open said member to the surrounding atmosphere, said selector means including a shiftable element having an area subjectable to said pressure source for providing a force to hold itself in a position to close said member from the surrounding atmosphere for subjecting same to said pressure-portion as long as said pressure is produced, a flexible tube for transmitting said fluid pressure from said source to said pressure-operated member, pinch-clamp means operatively associated with said tube and disposed to squeeze same closed, and release means operated by said brake-actuating means upon normal movements thereof to cause said pinch-clamp means to squeeze said tube for precluding said pressure from operating said pressure-operated member for rendering said regulator mechanism inactive.

33. In a speed control device for an automotive vehicle including an engine having control means therefor normally retarded to decrease vehicle speed, and conversely, and including vehicle brake-actuating means, said vehicle also including a source of fluid pressure produced as a result of operation of the vehicle, the combination comprising; a regulator mechanism responsive to a signal accompanying a change in vehicle speed for causing automatic regulating movements of said control means to maintain a preselected vehicle speed; said regulator mechanism including a pressure-responsive member operatively connected to said control means for effecting said speed-regulating movements thereof; a fluid circuit communicating with said pressure-responsive member and with said source of pressure for inducing a flow of fluid through the circuit; valve means in said circuit responsive to said signal to bleed fluid in relation to said circuit after said preselected speed is attained for controlling the pressure from said circuit acting on said pressure-responsive member, to advance said control means when the vehicle speed falls below said preselected value, and conversely, to provide said automatic regulation of said control means; said valve means including a valve body member and a mating member cooperable therewith, substantially frictionless swingable means imparting rigidity in one direction acting to support one of said valve members for substantially frictionless movements in a direction transverse to said first-named direction by maintaining said supported valve member suspended within the fluid controlled thereby completely free of surface contact during operational movements thereof, said valve means including means operable in response to said signal before a predetermined speed is attained to bleed fluid in relation to said circuit for changing the pressure acting on said pressure-responsive member to prevent same from operating said control means; said last-named means being disposed to terminate said second-named fluid bleed when said predetermined speed is attained after normal advancement of said control means by the vehicle-driver; and release means operated by said brake-actuating means upon normal movements thereof for rendering said regulator mechanism inoperative.

34. In a speed control device for an automotive vehicle including an engine having control means therefor normally retarded to decrease vehicle speed, and conversely, and including vehicle brake-actuating means, said vehicle also including a source of fluid pressure produced as a result of operation of the vehicle, the combination comprising; a regulator mechanism responsive to a signal accompanying a change in vehicle speed for causing automatic regulating movements of said control means to maintain a preselected vehicle speed; said regulator mechanism including a pressure-responsive member operatively connected to said control means for effecting said speed-regulating movements thereof; a fluid circuit communicating with said pressure-responsive member and with said source of pressure for inducing a flow of fluid through the circuit; valve means in said circuit responsive to said signal to bleed fluid in relation to said circuit after said preselected speed is attained for controlling the pressure from said circuit acting on said pressure-responsive member, to advance said control means when the vehicle speed falls below said preselected value, and conversely, to provide said automatic regulation of said control means; said valve means including a valve element and an orifice element, one of said elements being movable in response to said signal in relation to the other said element in one direction to stand on one side thereof for producing said first-named fluid bleed; said one element being movable in a direction opposite to said first direction to stand on the opposite side of said other element in response to said signal before a predetermined speed is attained to bleed fluid in relation to said circuit for changing the pressure acting on said pressure responsive member to prevent same from operating said control means; said movable valve element being disposed to terminate said second-named fluid bleed when said predetermined speed is attained after normal advancement of said control means by the vehicle-driver; release means operated by said brake-actuating means upon normal movements thereof for rendering said regulator mechanism inoperative, said orifice element having an aperture therein, and means to mount said valve element to position same within said aperture to provide a predetermined clearance space between its perimetrical surface and the adjacent surface forming said aperture, and means to mount said orifice element, one of said mounting means including substantially frictionless swingable means imparting rigidity in all except one direction and acting to support said movable valve element and to maintain said perimetrical clearance in all operative positions of said movable element for substantially frictionless movements in said one direction.

35. In a speed control device for an automotive vehicle including an engine having control means therefor and having vehicle brake-actuating means with a suspended brakearm, said vehicle also including a source of fluid pressure as a result of operation of the engine and said vehicle including a steering post, the combination of; mechanism including a member operated by at least a portion of said pressure to regulate the position of said control means for establishing the speed of the vehicle, conduit means for directing said fluid pressure to said pressure-operated member, valve means operatively associated with said conduit means, said valve means including release means operated by said brake-actuating means upon normal movements thereof to actuate said valve means for precluding said pressure from operating said pressure-operated member, said release means including cam means having a cam portion disposed to ride against the side of said brake arm to cause said actuation of said valve means upon normal movements of said brake-actuating means and to enable said brake-actuating means to pass by said cam means without restriction, and means to mount said valve means and said release means to said steering post to support same for positioning said cam portion adjacent said arm in the free position thereof.

36. In a speed control device for an automotive vehicle including an engine having control means therefor normally advanced to increase vehicle-speed, and conversely, and including vehicle brake-actuating means, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, said mechanism including activating means operated automatically incident to normal advancement of said control means to automatically cause activation of said mechanism with respect to said control means after said advancement thereof by the vehicle-driver, means operated by said brake-actuating means upon normal movements thereof for rendering said regulator mechanism inactive to transmit said forces to said control means, said regulator mechanism including lost motion means operatively connecting said regulator mechanism and said control means, said lost motion means including a pair of elements relatively movable before said automatic activation occurs, one of said pair of elements being operatively connected to said control means and the other of said pair of elements being operatively connected to said regulator mechanism, one of said two elements including means operated by said other element as a result of said relative movement to produce an audible signal for indicating to the vehicle driver that said automatic activation has occurred.

37. In a speed control device for an automotive vehicle including an engine having control means therefor normally advanced to increase vehicle-speed, and conversely, and including vehicle brake-actuating means, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, said mechanism including a servo-motor and a source of energy for said servo-motor, pilot means responsive to changes in the speed of the vehicle to control the amount of said energy directed to said servo-motor for causing speed-restoring movements of said control means, said mechanism including activating means operated automatically incident to normal advancement of said control means to automatically cause activation of said mechanism with respect to said control means after said advancement thereof by the vehicle-driver, means operated by said brake-actuating means upon normal movements thereof for rendering said regulator mechanism inactive to transmit said forces to said control means, said regulator mechanism including lost-motion means operatively connecting said servo-motor and said control means, said lost-motion means including a pair of elements relatively movable before said automatic activation occurs, one of said pair of elements being operatively connected to said control means and the other of said pair of elements being operatively connected to said servo-motor, one of said two elements including leaf spring means operated by said other element as a result of said relative movement to produce an audible click signal for indicating to the vehicle driver that said automatic activation has occurred.

38. The combination of means defined in claim 25, and said activating means including a second valve member operatively associated with said first-named valve member and movable in relation thereto for causing said modification of said pressure between said two restrictions when said vehicle speed is below said predetermined value.

References Cited
UNITED STATES PATENTS

| | | | |
|---|---|---|---|
| 2,972,390 | 2/1961 | Bunker et al. | 180—82.1 |
| 3,023,828 | 3/1962 | Fuller et al. | 180—82.1 |
| 3,059,715 | 10/1962 | Lopez | 180—77 |
| 3,088,538 | 5/1963 | Brennan et al. | 180—82.1 |
| 3,100,021 | 8/1963 | Maurer et al. | 180—82.1 |
| 3,109,507 | 11/1963 | McMurray et al. | 180—82.1 |
| 3,120,874 | 2/1964 | Stoltman | 180—82.1 |
| 3,125,178 | 3/1964 | Stoltman et al. | 180—82.1 |
| 3,183,993 | 5/1965 | Parker et al. | 180—82.1 |
| 3,207,252 | 9/1965 | Cripe et al. | 180—82.1 |

KENNETH H. BETTS, *Primary Examiner.*

A. HARRY LEVY, BENJAMIN HERSH, *Examiners.*

E. E. PORTER, *Assistant Examiner.*